United States Patent [19]
Gabriagues

[11] Patent Number: 4,745,592
[45] Date of Patent: May 17, 1988

[54] COHERENT PHOTONIC TELECOMMUNICATIONS SYSTEM

[75] Inventor: Jean-Michel Gabriagues, Bailly, France

[73] Assignee: Compagnie Generale d'Electricite, Paris Cedex, France

[21] Appl. No.: 7,544

[22] Filed: Jan. 28, 1987

[30] Foreign Application Priority Data

Jan. 28, 1986 [FR] France ................................ 86 01161

[51] Int. Cl.⁴ ......................... H04B 9/00; G02B 6/28
[52] U.S. Cl. ...................................... 370/3; 455/607; 455/612; 350/96.16
[58] Field of Search ....................... 455/606, 607, 612; 370/3, 57; 350/96.16

[56] References Cited

U.S. PATENT DOCUMENTS 4,330,869  5/1982  Robieux .............................. 455/607
4,530,084  7/1985  Strebel et al. .......................... 370/3

OTHER PUBLICATIONS

IEEE Journal of Quantum Electronics, vol. QE-16, No. 9, Sep. 1980, "Injection Locking Characteristics of an AIGaAS Semiconductor Laser" by Kobayashi et al., pp. 915-917.

Electronics Letters, May 26, 1983, vol. 19, No. 11, pp. 15-16, "1.5 μm Wavelength GaInAsP C³ Lasers: Single-Frequency Operation and Wideband Frequency Tuning" by Tsang et al.

Primary Examiner—Michael A. Masinick
Assistant Examiner—Andrew J. Telesz, Jr.
Attorney, Agent, or Firm—Sughrue, Mion, Zinn, Macpeak, and Seas

[57] ABSTRACT

The system comprises subscriber stations (1, 2) each comprising a semiconductor laser generator (4) provided with means (3, 5) for modulating its laser output by means of transmit signals and a heterodyned detection system consisting of a photoelectric receiver (15) optically coupled to a local oscillator (17), an exchange (32) comprising a computer (37) and dual cavity semiconductor laser transmitters (39) connected to the outputs (38) of the computer, a passive optical distributor (31), and optical fibers (16, 8) connecting the lasers (4) and receivers (15) of each station with the optical distributor (31), on the one hand, and the lasers (4) of each station to the exchange (32), on the other hand, the computer assigning an optical frequency for each requested call and the laser transmitters of the exchange being operable to lock the transmit optical frequency of the calling and the called station lasers (4, 104), via optical fiber lines (8), on the frequency assigned by the computer.

8 Claims, 2 Drawing Sheets

COHERENT PHOTONIC TELECOMMUNICATIONS SYSTEM

This invention concerns a coherent photonic telecommunications system.

The inventive system is of the type comprising:

N subscriber stations, each comprising
- a transmitter circuit operable to deliver electric transmit signals,
- a calling circuit operable to deliver electric signals for calling other stations,
- a semiconductor laser generator, operable to deliver an optical transmit wave,
- an electrical power supply circuit connected to the input of the laser generator, the calling circuit and the transmit circuit being connected to the power supply circuit to modulate the optical transmit wave by the calling signals and transmit signals respectively,
- a photoelectric receiver,
- and a utilization circuit connected to the electrical output of the receiver,
- a passive optical distributor consisting of a material transparent to the transmit optical waves,
- and N pairs of optical fibers respectively connected to the N subscriber stations, each pair connected to a station comprising an optical fiber having one end thereof connected to the output of the laser and another optical fiber having one end thereof connected to the optical input of the photoelectric receiver and the other end thereof connected to the passive optical distributor.

An optical telecommunications system of this type is described in the French patent application published under the No. 2,472,889.

In each pair of optical fibers in that system, the fiber connected at one end to the laser is connected at the other end to the passive optical distributor to feed the transmit optical wave thereto, and the other fiber is a receiving optical fiber which transmits a receive optical wave from the passive optical distributor to the receiver; optical frequencies $F_1 \ldots F_N$ and modulation frequencies $f_1 \ldots f_N$ are respectively assigned to the N subscriber stations; the laser of subscriber p thus delivers a transmit lightwave of frequency $F_p$, which lightwave is modulated by the modulation frequency $f_n$ assigned to another subscriber n with which the subscriber p wishes to communicate. Moreover, the station of subscriber p further comprises the following:
- $N-1$ optical filters which respectively pass only the frequencies $F_1 \ldots F_{p-1}, F_{p+1} \ldots F_N$, said filters being arranged to receive the receive optical wave transmitted by the receive optical fiber,
- $N-1$ selective photoelectric detectors respectively receiving the light energy leaving the $N-1$ optical filters, said detectors supplying an electric signal only if the amplitude of the light energy they receive is modulated at frequency $F_N$,
- means receiving the electric signals delivered by the selective detectors and operable to signal to subscriber p the order n of the Fn frequency filter the output radiation whereof caused an electric signal to be emitted by the selective detector receiving said radiation output,
- an optical waveguide or "conductor" one end whereof is disposed at the input face of the photoelectric receiver,
- and means for positioning the other end of the optical conductor on the output of the Fn frequency optical filter.

This telecommunications device has the disadvantage of being difficult to use when the number N of subscribers is high. In such cases, it is necessary to provide a large number of mutually different optical frequencies. Moreover, the receiving system for each subscriber is bulky and difficult to realize.

It is the object of the present invention to obviate this disadvantage.

Another such optical fiber communications system is taught in European patent application No. 0-077-292, comprising a switching exchange involving a laser reference unit linked to the transmitting and receiving installations, which are equipped with tunable lasers and a computer to designate communications channels, reception being accomplished by heterodyning. In this document, frequency control of the lasers by the central processor is achieved by electronic means.

It is another object of the invention to realize an installation in which control of the laser's operation is purely optical.

The invention accordingly provides a coherent photonic telecommunications system of the above-mentioned type wherein, the optical fiber connected to the laser being a control line and the other optical fiber being a communications line, each subscriber station comprises
- means for maintaining the temperature of the laser source at a predetermined, fixed value,
- a photoelectric detector the optical input whereof is connected to the control line optical fiber,
- and a tuning circuit the input whereof is connected to the electrical output of the photoelectric detector and one output whereof is connected to the laser's power supply circuit said tuning circuit being operable, when no signals are received at its input, to adjust the supply current to the laser to set the transmit optical wave to an optical frequency $f_A$, the calling circuit enabling modulation of the transmit optical wave of frequency $f_A$ by the calling signals from another station, wherein a switch is provided, comprising
- N photoelectric detectors connected respectively to the N subscriber stations by the other ends of the N optical fiber control lines, to receive the transmit optical waves modulated by the calling signals,
- a computer connected to the electrical outputs of the N detectors to receive the calling signals coming from the various stations, said computer being operable to assign, for each call booked between a calling station and a called station, an optical frequency $f_c$ available at the time of the call, selected from a predetermined list of frequencies separated from one another by a constant frequency interval,
- and N single-mode laser transmitters whose outputs are optically connected to the N control line fibers coming from the N stations, each transmitter being equipped with two coupled cavities and disposed in a constant-temperature enclosure, the electrical input of each laser transmitter being connected to the computer via a control circuit, said control circuit being operable, when the station connected to same transmitter is not callingly engaged with another station, to tune the output frequency of the laser transmitter to the value $f_A$, which value is reserved for communications between the exchange and the N stations, the control circuits being operable, when a call is booked or initiated, to modulate the frequency $f_A$ of the laser transmitters connected to the calling and called stations by signals representative of the frequency $f_c$ assigned by the computer for same call, the specific $f_c$ frequency data being transmitted along the control fiber lines to the detectors and the tuning circuits of the calling and called stations, said tuning circuits being operable to adjust the supply currents to the lasers of said stations such that the frequency of their transmit optical waves will be equal to $f_c$, the control circuits connected to the calling and called stations then being operable to adjust the frequency of the laser transmitters connected to same to the value $f_c$, such that the radiant energy at frequency $f_c$ emitted by said transmitters and transmitted through the control optical fiber lines are injected into the cavity of the lasers of the calling and called stations to lock their transmit frequency at the frequency $f_c$, and wherein each subscriber station further comprises
means for optically connecting the output of the laser to the communications optical fiber, so that said fiber can transmit to the passive optical distributor the transmit optical wave of frequency $f_c$ modulated by the transmit electric signals, a servocontrol circuit connected to the tuning circuit and to the electrical input of the local oscillator, so that it tunes the output frequency of the local oscillator to a value $f_D$ close to $f_c$ when the tuning circuit receives the computer-assigned frequency $f_c$ information for a call between the concerned station and any other station, the difference $f_d - f_c$ being small compared to the interval between two successive frequencies in the list of predetermined frequencies and means for optically connecting the output of the local oscillator with the input to the photoelectric receiver, such as to form a heterodyned detection system capable of picking up the transmit optical waves received by the passive optical distributor and transmitted along the communications fiber, the electrical output of said heterodyned detection system being connected to the utilization circuit.

In accordance with one embodiment of the system according to the invention, each station furthermore comprises an isolator connected in series in the link between the laser output and the communications optical fiber.

According to another embodiment of the invention, the exchange is further provided with isolators each connected in series between a laser and the control optical fiber.

According to yet another embodiment of the invention, each station comprises an alarm or ringing circuit connected to the tuning circuit.

According to still another embodiment of the invention, the control circuit for each station comprises a frequency control circuit connected to the local oscillator's electrical input, a power supply circut connected to the frequency control circuit and to the tuning circuit, and a frequency discriminating circuit connected to the frequency control circuit and to the electrical output of the receiver.

According to another embodiment of the invention, each station further comprises a decoding circuit series connected between the output of its detector and the tuning circuit.

According to yet another alternative embodiment of the invention, the switching exchange further comprises decoding circuits, each of which circuits being connected in series between one of its detectors and the computer.

According to another embodiment of the invention, each station further comprises a decoding circuit connected in series between the output of the heterodyned detection system and the utilization circuit.

Specific embodiments of the invention will now be described by way of nonlimiting examples thereof, with reference to the appended drawings in which:

FIG. 1 shows a telecommunications system designed to serve N subscribers. Each subscriber has one sending and receiving station, only two of which (1 and 2) are actually represented for purposes of simplification.

Figure 1:
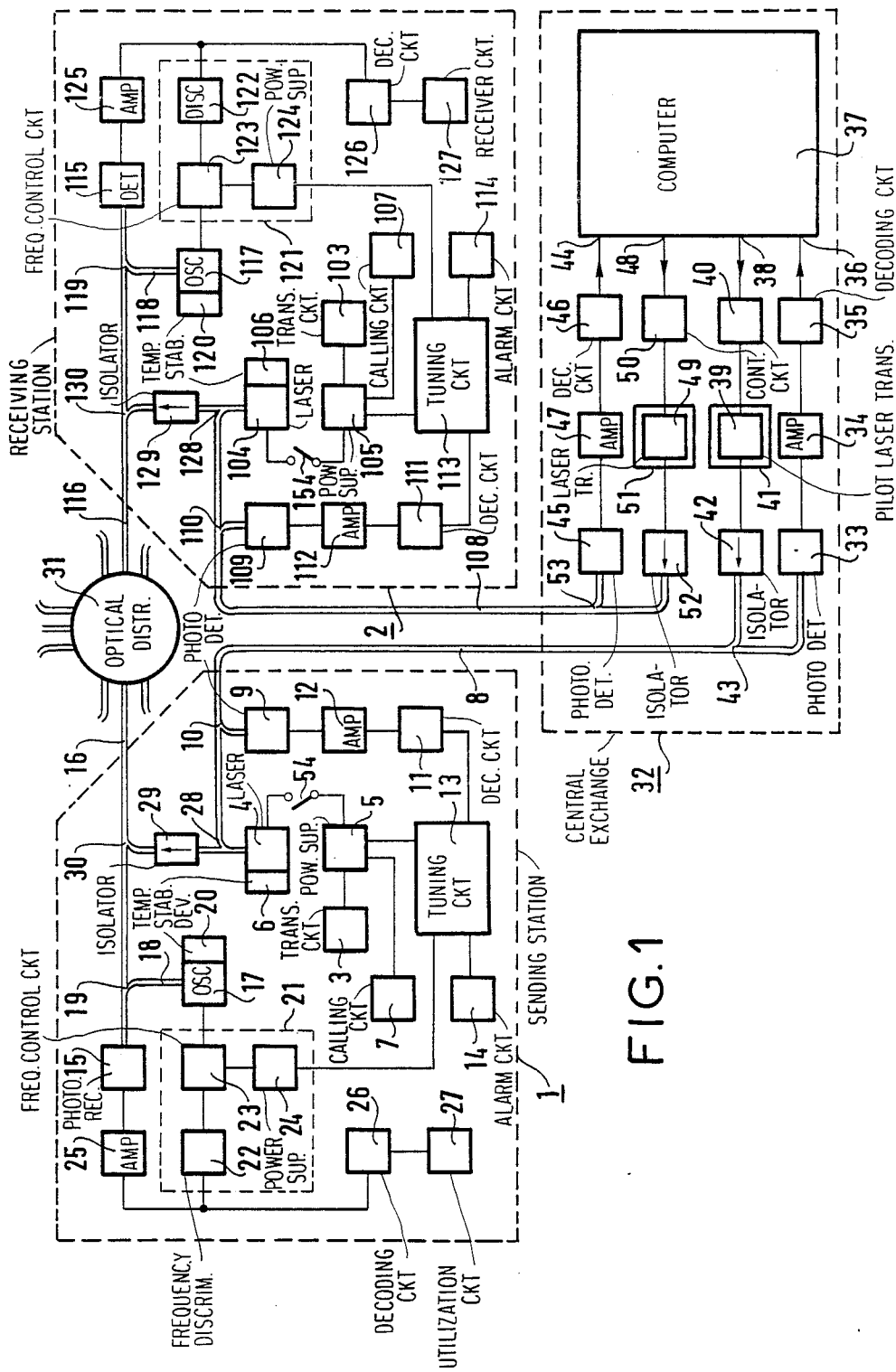
FIG. 1 is a schematic of one circuit configuration of the system according to the invention.

Station 1 comprises a transmit circuit 3 operable to deliver electric transmit signals which may be telephone or video signals. The transmit circuit 3 is connected to a power supply circuit 5 also connected to the electrical input of a semiconductor laser generator 4 via a switch 54. The laser 4 is provided with a temperature stabilizing device 6, known per se, using for example the Peltier effect. A calling circuit 7 is connected to the power supply circuit 5. The output of the laser 4 is optically coupled to one end of an optical fiber 8.

Station 1 further comprises a photoelectric detector 9 whose optical input is connected to the optical fiber 8 by means of a coupler 10. The detector's electrical output is connected to a decoding circuit 11 via an amplifier 12. Circuit 11 is connected to the input of a tuning circuit 13 one of whose outputs is connected to the supply circuit 5 and another to an alarm circuit 14.

Station 1 in addition includes a photoelectric receiver 15 whose optical input is coupled to one end of an optical fiber 16. A local oscillator 17, consisting of a semiconductor laser, is disposed near the receiver 15. The output of oscillator 17 is connected to the input of the receiver 15 via an optical fiber element 18 and a coupler 19 arranged on the fiber 16. The local oscillator 17 is provided with a temperature stabilizing device 20 analogous to that already designated by the numeral 6. A control circuit 21 is connected to the electrical input to the oscillator 17. This control circuit includes a frequency discriminator 22 connected to the local oscillator 17 input via a frequency control circuit 23, said circuit 23 being also connected to an output of the tuning circuit 13 via a power supply circuit 24. The electrical output of receiver 15 is connected via an amplifier 25 to the input of a decoding circuit 26, the discriminator 22 being connected to the circuit path between the amplifier 25 and the decoder 26. A utilization circuit 27 is connected to the output of decoder 26.

The output of laser 4 is connected to the optical fiber 16 via a coupler 28 on fiber 8, an isolater 29 and a coupler 30 on fiber 16.

Station 2 is completely identical to Station 1 and like items in Station 2 corresponding to the items 3 through 30 and 54 of Station 1 are respectively labelled 103 to 130 and 154.

The system diagrammed in FIG. 1 further includes a passive optical distributor 31, being for example a sphere or ball. This ball may consist of a shell containing diffusing elements, filled with a transparent material having a refractive index approximating that of the optical fiber cores. Such material may for example be air. The ends of the optical fibers such as fibers 16 or 116, connected both to the receiver and to the lasers of the various subscriber stations, are coupled, such as by fusion for example, to the shell or envelope of the optical distributor 31.

The system illustrated in the figure moreover includes a central exchange 32 next to which the passive optical distributor 31 can be disposed.

This exchange is linked to the N subscriber stations by the optical fibers such as 8 connected both to the laser 4 and the detector 9 of each station 1, 2, ... N. The exchange 32 comprises a photoelectric detector 33 whose electrical input is connected to the opposite end of the fiber 8 from the station 1. The detector's electrical output 33 is connected, via an amplifier 34 and a decoding circuit 35 connected in series, to an input 36 of a computer 37. A corresponding output 38 of the computer 37 is connected to the electrical input of a pilot laser transmitter 39 via a control circuit 40. The pilot laser transmitter 39 is placed in an enclosure 41 that is kept at a constant temperature. The optical output of the laser 39 is connected via an isolator 42 and a coupler 43 to the optical fiber 8. The computer 37 comprises N−1 other input/output (I/O) pairs identical to I/O pair 36-38 and assigned to communications between the computer and the other subscriber stations of the system. Only one other pair, consisting of input 44 and output 48, is shown in FIG. 1, that being the one assigned to communications between the computer and Station 2. The input 44 is connected to a photoelectric detector 45 via a decoding circuit 46 and an amplifier 47 connected in series. The output 48 is connected to a laser transmitter 49, placed in a constant temperature enclosure 51, via a control circuit 50. The output of laser transmitter 49 is connected via an isolator 52 to the free end of the fiber 108 being also connected the input of the detector 45, via a coupler 53.

The operation of the system illustrated in FIG. 1 is as follows.

The semiconductor laser 4 is a longitudinal multimode current type, each mode corresponding to a frequency band having a bandwidth of the order of a gigahertz. The temperature stabilizing means 6 can keep the laser's temperature constant, for example to within 0.05° C. at 20° C. When the user of Station 1 wishes to initiate a call to the user of Station 2, he closes switch 54. The supply circuit 5 then adjusts the supply current to laser 4 with an accuracy of 1 mA. Lacking any electrical signals at its input, the tuning circuit 13 drives the supply circuit 5 such that the value of the supply current delivered to the laser 4 causes the laser to operate at an optical frequency $f_A$ reserved for communications between the various subscriber stations and the exchange 32.

Each station is assigned a calling number. The user of Station 1, to initiate his call to Station 2, enters the number assigned to Station 2 in calling circuit 7. This calling circuit can be controlled through a keypad for instance, typical of conventional telephone systems. The electric calling signals delivered by circuit 7 modulate the supply current of laser 4 to produce a corresponding intensity modulation of the transmit optical wave.

The latter wave is sent as modulated through fiber 8 to the detector 33 of the exchange 32. The detector 33 thus supplies the electric calling signals which go to the input 36 of the computer 37, after amplification and decoding by the circuits 34 and 35. The computer 37 processes the calls coming from the different stations and allocates to each requested call a different optical carrier frequency. It has available a plurality of optical frequencies arranged in a pre-established list. The computer 37 receives data about all the calls in process and designates for example the lowest order frequency available. Accordingly, on receiving the calling signals from Station 1 for a call to Station 2, the computer assigns an optical frequency $f_c$ to said call.

The computer 37 passes the information concerning said frequency $f_c$ to its output 38 in the form of electric signals, said output being associated with the input 36 for Station 1 to exchange communications. The same signals are then transmitted to the control circuit 40.

Figure 2:
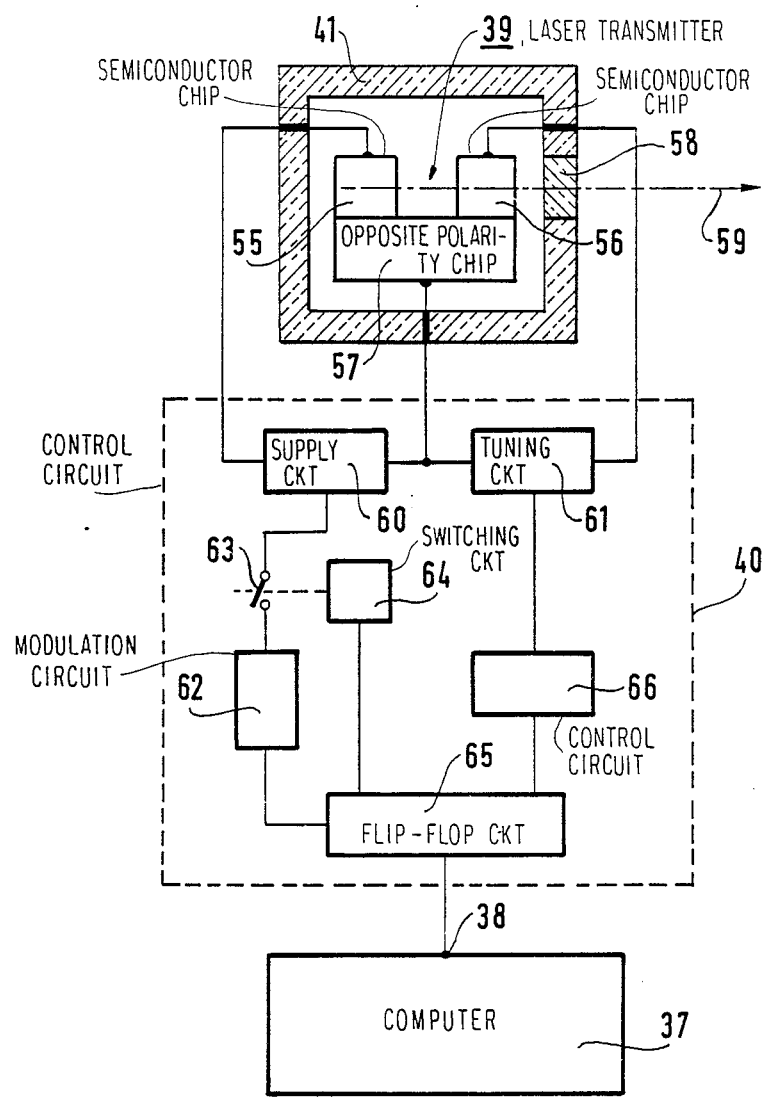
FIG. 2 is a detailed diagram of one of the circuits being part of the system represented in FIG. 1.

FIG. 2 is a more detailed block diagram of circuit 40 and laser transmitter 39.

The semiconductor laser transmitter 39 is of the type having coupled split cavities described in the US publication "Electronics Letters" in an article entitled "1.5 μm Wavelength Ga In As P C3 Lasers: Single-Frequency Operation and Wide Band Frequency Tuning", by W. T. Tsang et al, May 26, 1983, Vol. 19, No. 11, pages 415 and 416. The laser transmitter 39 comprises two same-polarity semiconductor chips 55 and 56 associated with a single, opposite-polarity chip 57, such as to form two, coupled semiconductor junctions. The laser transmitter is maintained at a constant temperature of for example 20° C., with an accuracy of 0.001° C. It is placed for this purpose in a thermostatically controlled enclosure or "crystal oven" 41 having a window 58 allowing its output beam to pass through along an axis 59 to an isolator 42 (FIG. 1). The enclosure 41 also comprises electrical passages for the laser's three electrical leads. This laser transmitter is able to emit a single-mode beam in a very fine emission line having a bandwidth of the order of a megahertz.

Circuit 40 comprises a supply circuit 60 connected to polarize the junction 55-57 of the laser transmitter by means of a supply current adjusted above the laser threshold, and a tuning circuit 61 connected to polarize the junction 55-57 by means of a tuning current adjustable below the laser threshold. The supply circuit 60 is connected to a modulation circuit 62 via a switch 63. Modulation circuit 62 is connected to one output of a flip-flop circuit 65.

Opening and closing of the switch 63 is controlled by a switching circuit 64 connected to another output of the flip-flop 65. Still another output of circuit 65 is connected to the tuning circuit 61 via a control circuit 66. Finally, the input of circuit 65 is connected to the output 38 (see FIG. 1) of the computer 37.

The supply current supplied by circuit 60 is adjusted once and for all with an accuracy of 0.001° C. As soon as the computer 37 receives the calling signals from Station 1, it switches the flip-flop 65 to a first switching position. Circuit 65 then drives the control circuit 66 to adjust the tuning current supplied by circuit 61 to a value such that the optical frequency emitted by the laser transmitter 39 is the same as the frequency $f_A$ reserved for communications between the stations and the exchange. Also, flip-flop 65, via switching circuit 64, closes switch 63. Modulation circuit 62 at this time delivers electric signals representative of the frequency $f_c$ designated by the computer. These signals modulate the laser transmitter supply current, thus causing a corresponding modulation of the intensity of the laser radiation delivered by the laser transmitter. This modulated radiant energy is transmitted through isolator 42, optical fiber 8 and detector 9 to the input of the tuning circuit 13 of Station 1.

Isolator 42, like the other isolators used in the system, allows the optical signals to pass in one direction but blocks all optical transmissions in the opposite direction. Such isolators, which are well known in the art, serve to prevent a laser's operation being disturbed by emissions propagating in the reverse direction.

The tuning circuit 13 thus receives the computer-designated $f_c$ frequency information and acts upon the supply circuit 5 to cause the emission of laser generator 4, which was set to frequency $f_A$, to be tuned to a frequency band containing the assigned frequency $f_c$. The beam of laser 4 travels down optical fiber 8 to the exchange 32. As soon as the calling signals cease to arrive at input 36 of the computer, the computer controls flip-flop circuit 65 to swtich to a second position. Switch 63 then opens and circuit 66 adjusts the tuning current delivered by tuning circuit 61 such that the emission frequency of laser transmitter 39 exactly equals the computer-designated frequency $f_c$. It should be recalled that the emitted beam of laser transmitter 39 is single-mode and has a very narrow bandwidth, of approximately one megahertz. This beam is injected through fiber 8 into the cavity of laser 4. The beam output of laser 4 is thus "locked" on that of laser transmitter 39, meaning that the output of laser 4 is exactly tuned to the frequency of the output of laser 39 and has the same spectral line width. Such locking action is described in the article, "Injection Locking Characteristics of an AIGaAs Semiconductor Laser" by S. Kobayaski et al, IEEE Journal of Quantum Electronics, Vol. QE16, No. 9, September 1980, pages 915-917.

The laser 4 is accordingly ready to beam to the optical distributor 31, via isolator 29 and optical fiber 16, at a very precisely defined carrier frequency $f_c$. This beam is modulated by the transmit electric signals supplied by circuit 3 in a narrow frequency band of the order of 10 megahertz to form a message intended for the user of Station 2.

The local oscillator 17 of Station 1 is a typical semiconductor laser able to emit a multimode beam. Preferably, the local oscillator 17 is selected to provide much narrower output frequency bands than those of laser 4. The temperature stabilizing device 20 associated with oscillator 17 serves to maintain the oscillator's temperature at a value of for example 20° C. with a tolerance of 0.05° C. The tuning circuit 13, having received the computer-designated frequency $f_c$ information, transmits it to the control circuit 21. The latter, thanks to frequency discriminator 22, enables the local oscillator's 17 output frequency to be controlled to a frequency closely approximating the frequency fc having been assigned by the computer and emitted by the laser 4 of Station 1. This is accomplished by tuning the frequency discriminator 22, which is in fact a narrow band filter, to a frequency difference d which is small compared to the spacing of frequencies in the list of pre-established frequencies from which the computer has selected frequency $f_c$. The local oscillator 17 is thus tuned to a frequency $f_D = f_c + d$, and its output beam illuminates the optical receiving surface of the receiver 15.

In like manner, the computer 37 sends to Station 2 via circuit elements 50, 49, 52 and optical fiber 108 the computer-designated frequency fc information. Within Station 2, this data is sent to the tuning circuit 113 through elements 109, 112 and 111. The alarm or ringing circuit 114 is activated. The user of Station 2 closes the switch 154, which deactivates the alarm circuit 114. The beam output of laser 104 is tuned, then locked on frequency fc and the output of the local oscillator 117 is tuned to frequency fD.

The communications system diagrammed in FIG. 1 is then ready for communication between stations 1 and 2. The transmit signals modulating the transmit wave of Station 1 are received by optical distributor 31 via fiber 16. Fiber 116 channels some of the energy of the transmit wave to the Station 2 detector 115, which operates on a heterodyning detection basis and delivers an electrical wave at a frequency $d = f_D - f_c$, modulated by the transmit signals of Station 1. The decoding circuit 126 delivers the transmit signals to the receiver circuit 127. Likewise, the transmit signals modulating the transmit wave of Station 2 are received through fiber 116 by the passive optical distributor 31. A part of the energy of this wave channelled by fiber 16 is received by the receiver 15 also operating on a heterodyning detection basis. The decoder circuit 26 receives an electrical wave of frequency d modulated by the transmit signals of Station 2. Circuit 26 feeds these transmit signals to receiving circuit 27.

The above-described communications system can operate with an overall transmission waveband of of a few nanometers, or otherwise stated, a frequency bandwidth of approximately 1000 GHz, around a wavelength of 1550 nanometers. It is thus possible to envisage implementation of at least 1000 transmission channels, accommodating roughly 1000 simultaneous calls. The system according to the invention can also be applied to a system of coherent transmissions of video images at 100 Mbits/s, with an overall dynamic range of 60 to 70 dB. The optical power required for locking the frequency of a semiconductor laser being of the order of 10-6 to 10-5 W, unrepeatered links more than 200 km long between subscribers can be envisaged.

The telecommunications system according to the invention affords the advance of simplifying the componentry used in the subscriber stations by concentrating the sensitive components of the system in the exchange, where environmental control and maintenance requirements are more easily met than in subscriber's premises.

What is claimed is:

1. A coherent photonic telecommunications system comprising
N subscriber stations, each comprising
    a transmitter circuit operable to deliver electric transmit signals,
    a calling circuit operable to deliver signals for calling other stations,
    a semiconductor laser generator, operable to deliver an optical transmit wave,
    an electrical power supply circuit connected to the input of the laser generator, the calling circuit and the transmit circuit being connected to the power supply circuit to modulate the optical transmit wave by the calling signals and electrical transmit signals respectively,
    a photoelectric receiver, and a utilization circuit connected to an electrical output of the receiver, a passive optical distributor consisting of a material transparent to the optical transmit waves, and N pairs of optical fibers respectively connected to the N subscriber stations, each pair connected to a station comprising an optical fiber having one end thereof connected to the output of the laser generator and another optical fiber having one end thereof connected to an optical input of the photoelectric receiver and the other end thereof connected to the passive optical distributor.

wherein, the optical fiber connected to the laser generator being a control line and the other optical fiber being a communications line, each subscriber station comprises means for maintaining the temperature of the laser source at a predetermined, fixed value, a photoelectric detector the optical input whereof is connected to the control line optical fiber, and a tuning circuit the input whereof is connected to the electrical output of the photoelectric detector and one output whereof is connected to the laser generator's power supply circuit, said tuning circuit being operable, when no signals are received at its input, to adjust the supply current to the laser generator to set the optical transmit wave to an optical frequency $f_A$, the calling circuit enabling modulation of the optical transmit wave of frequency $f_A$ by the calling signals from another station, wherein a switch or exchange is provided, comprising N photoelectric detectors connected respectively to the N subscriber stations by the other ends of the N optical fiber control lines, to receive the optical transmit waves modulated by the calling signals, a computer connected to the electrical output of the N photoelectric detectors to receive the calling signals coming from the various stations, said computer being operable to assign, for each call booked between a calling station and a called station, an optical frequency $f_c$ available at the time of the call, selected from a predetermined list of frequencies separated from one another by a constant frequency interval, and N single-mode laser transmitters whose outputs are optically connected to the N optical fiber control lines coming from the N stations, each laser transmitter being equipped with two coupled cavities and disposed in a constant-temperature enclosure, the electrical input of each laser transmitter being connected to the computer via a control circuit, said control circuit being operable, when the station connected to the same laser transmitter is not callingly engaged with another station, to tune the optical frequency of the laser transmitter to the value $f_A$, which value is reserved for communications between the exchange and the N stations, the control circuits being operable, when a call is booked or initiated, to modulate the frequency $f_A$ of the laser transmitters connected to the calling and called stations by signals representative of the frequency $f_c$ assigned by the computer for same call, the specific $f_c$ frequency data being transmitted along the control fiber lines to the photoelectric detectors and the tuning circuits of the calling and called stations, said tuning circuits being operable to adjust the supply currents of the laser generators of said stations such that the frequency of their optical transmit waves will be equal to $f_c$, the control circuits connected to the calling and called stations then being operable to adjust the frequency of the laser transmitters connected to same to the value $f_c$, such that the radiant energy at frequency $f_c$ emitted by said laser transmitters and transmitted through the control optical fiber lines are injected into the cavity of the laser generators of the calling and called stations to lock their transmit frequency at the frequency $f_c$, and wherein each subscriber station further comprises means for optically connecting the output of the laser generator to the communications optical fiber, so that said fiber can transmit to the passive optical distributor the optical transmit wave of frequency $f_c$ modulated by the electric transmit signals, a servocontrol circuit connected to the tuning circuit and to an electrical input of a local oscillator, so that it tunes the output frequency of the local oscillator to a value $f_D$ close to $f_c$ when the tuning circuit receives the computer-assigned frequency $f_c$ information for a call between the concerned station and any other station, the difference $f_D$-$f_c$ being small compared to the interval between two successive frequencies in the list of predetermined frequencies and means for optically connecting the output of the local oscillator with the input to the photoelectric receiver, such as to form a hetereodyned detection system capable of picking up the optical transmit waves received by the passive optical distributor and transmitted along the optical fiber communications line, the electrical output of said heterodyned detection system being connected to the utilization circuit.

2. A photonic telecommunications system as in claim 1, wherein each subscriber station furthermore comprises an isolator connected in series in the link between the laser generator output and the communications optical fiber.

3. A telecommunications system as in claim 1, wherein the exchange is further provided with isolators each connected in series between a laser transmitter and the control optical fiber.

4. A telecommunications system as in claim 1, wherein each station includes an alarm or ringing circuit connected to the tuning circuit.

5. A telecommunications system as in claim 1, wherein the control circuit for each station comprises a frequency control circuit connected to the local oscillator's electrical input, a power supply circuit connected to the frequency control circuit and to the tuning circuit, and a frequency discriminating circuit connected to the frequency control circuit and to the electrical output of the receiver.

6. A telecommunications system as in claim 1, wherein each station further comprises a decoding circuit series connected between the output of its photoelectric detector and the tuning circuit.

7. A telecommunications system as in claim 1, wherein the switching exchange further comprises decoding circuits each of said circuits being connected in series between one of its N photoelectric detectors and the computer.

8. A telecommunications system as in claim 1, wherein each station further comprises a decoding circuit connected in series between the output of the heterodyned detection system and the utilization circuit.

* * * * *